Feb. 20, 1940.  P. S. CARTER  2,191,271
MEANS FOR MAKING IMPEDANCE MEASUREMENTS AT HIGH RADIO FREQUENCIES
Filed March 26, 1938
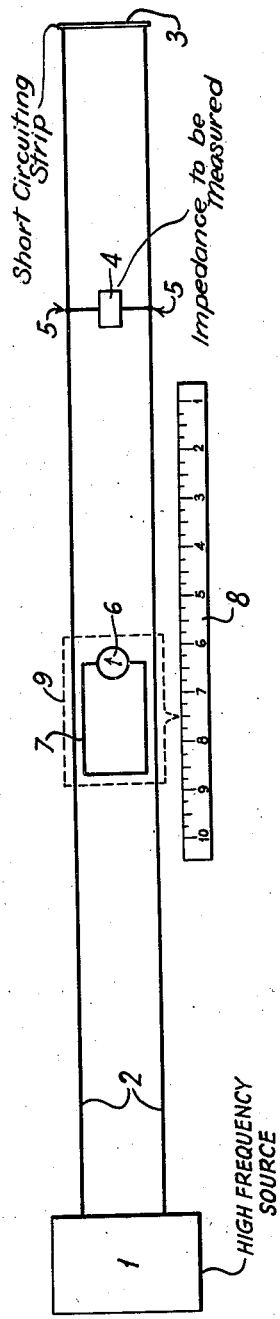
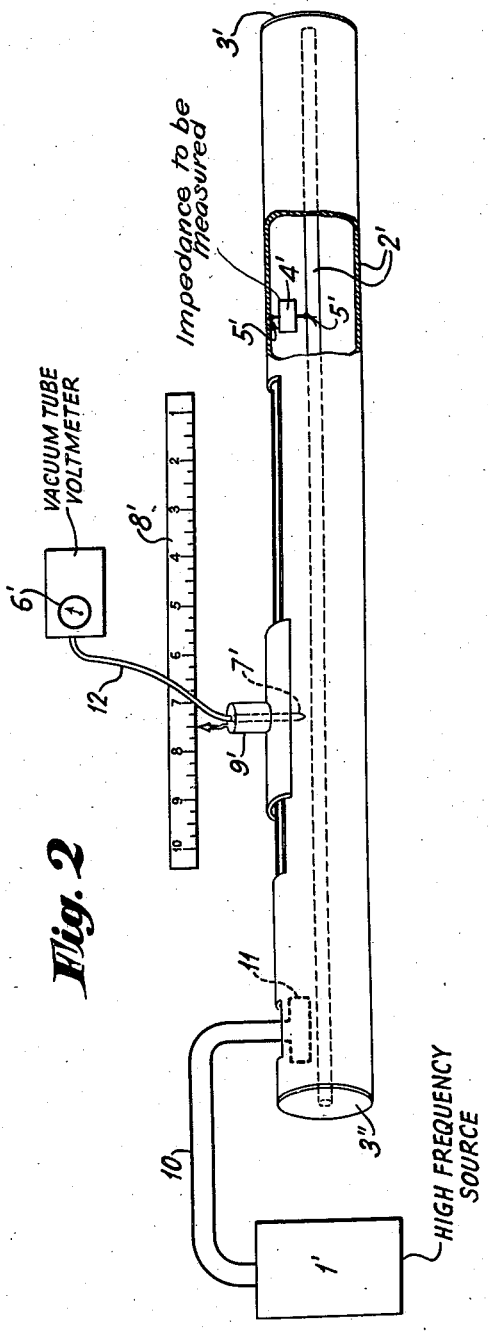
INVENTOR.
PHILIP S. CARTER
BY
ATTORNEY.

Patented Feb. 20, 1940

2,191,271

UNITED STATES PATENT OFFICE 2,191,271

MEANS FOR MAKING IMPEDANCE MEASUREMENTS AT HIGH RADIO FREQUENCIES

Philip S. Carter, Port Jefferson, N. Y., assignor to Radio Corporation of America, a corporation of Delaware Application March 26, 1938, Serial No. 198,200

6 Claims. (Cl. 171—95)

The present invention relates to a simplified and improved apparatus for measuring the reactive and resistive components of an impedance at high radio frequencies.

In the high frequency art it is important to know the values of resistance and reactance, inductive or capacitive, in an impedance before placing it into service in a circuit. At frequencies higher than ten megacycles, the measuring meters ordinarily available cannot be depended upon for reading absolute values of current or voltage; in fact, at frequencies higher than thirty megacycles, meter readings are ordinarily extremely unreliable. It is known that a resistor unit having the properties of a practically pure resistance at low frequencies may become an impedance consisting of some entirely different value of resistance and a large inductive or capacity reactance at very high frequencies.

The present invention enables the accurate measurement of any type of impedance, and its resistive and reactive components, under the exact condition of frequency, type of mounting and connection leads under which it is to be used. By means of a simple procedure, according to the invention, I entirely avoid many doubtful factors present in methods commonly used heretofore in the measurement of impedances.

In general, the invention makes use of a radio frequency transmission line, either closed or open at its far end, having a length equal to or greater than three-quarters of a wavelength, connected to a high frequency source; a pair of terminals for connecting the unknown impedance to be measured across the transmission line at a location according to a definite law to be described later; a sliding radio frequency meter either inductively or electrostatically coupled to the wires; and the necessary equipment for measurement of distance along the line.

One advantage of the present invention is that the values of the resistive and reactive terms of any unknown impedance may be accurately determined without the use of ammeters and voltmeters having known absolute calibrations. The values of resistance and reactance of the impedance are entirely determined by the ratio of loop to nodal currents or voltages and the position of a nodal point from the impedance to be measured.

Another advantage of the invention is that the equipment I employ is very easily set up wherever there may be a high frequency source of supply.

A better understanding of the invention will be had by referring to the following description, taken in conjunction with the Figs. 1 and 2 of the invention, showing schematic diagrams of two preferred arrangements of the invention.

Referring to Fig. 1, an arrangement for making measurements in accordance with the invention comprises a suitable source of high frequency energy 1, which is connected to one end of a transmission line 2, terminating at the other end in short circuiting bar or strip 3. Transmission line 2 has a length equal to or greater than three-quarters of a wavelength (3/4λ) at the operating frequency. Numeral 4 represents the unknown impedance which is connected across the line at the connection points 5 which are located in a manner described in detail hereinafter.

For determining the location of the terminating impedance 4 and the ratios of maximum to minimum current, or voltage, there is provided a sliding galvanometer 6 in series with a wire loop 7, both galvanometer and loop being mounted on a support 9, shown in dotted lines, in a manner such that the loop and galvanometer may be slid along the wires of the transmission line 2 without varying their relative positions to the conductors of the line. A measuring scale 8 is also shown positioned along the line for convenience in accurately locating the positions of the sliding meter 6. Maxima of current occur on the line at points spaced one-half wavelength apart. Similarly, minima also appear at points on the line spaced one-half wavelength apart, the minima points being located a quarter wavelength from the maxima points. By sliding support 9 along the wires of line 2, these points of maxima and minima will be indicated in the meter 6. It will be obvious from a mere inspection of the drawing, that the meter is inductively coupled to the line by means of the wire loop 7.

The manner in which the values of the resistive and reactive components of the impedance 4 is obtained (by means of the arrangement of Fig. 1) will now be described:

The power source 1 is first loosely coupled to the two wire line 2 at its input end, appearing at the left of the line. Before placing the impedance 4 in shunt across the line, and without any other impedance shunting the line, the position of the current node nearest to the short circuiting bar or strip 3 is accurately located. The position will be found to be $\lambda/4 - q$, where $q$ is the end correction for the short circuiting strip. It will be found that the correction $q$ has a value between zero and S/2 where S/2 is the conductor spacing. This is the position for connection of the unknown impedance 4. The scale 8 should be laid below the line 2 with its zero reading at this current node point.

The impedance 4 to be measured should now be connected across the line at the current nodal point nearest the strip 3, and the ratio of maximum to minimum current then obtained from the sliding meter. Assume this ratio to be Q. The position of the current minimum on the scale is now accurately determined. This can be most accurately done by taking the mid position between two equal readings of the meter, one each side of the minimum, where the rate of change of current with position is greatest. Call the distance from the impedance to the foregoing current minimum $d$.

The value of Z is then:

$$Z = Z_0 \frac{2Q + j(Q^2-1) \sin(720°.d/\lambda)}{Q^2+1-(Q^2-1)\cos(720°.d/\lambda)}$$

the resistance and reactance terms being given by the real and imaginary parts of the above expression. When the reactance is inductive, the sign of the imaginary term is positive, and when the reactance is capacitive, the sign of the imaginary term is negative. $Z_0$ in the above expression is the characteristic impedance of the line. The value of $Z_0$ is determined by the spacing $S$ and radius $a$ of the line conductors by the expression:

$$Z_0 = 60 \log_e \frac{S+\sqrt{S^2-4a^2}}{S-\sqrt{S^2-4a^2}} \text{ ohms}$$

When the spacing is large compared to the wire radius, this becomes approximately:

$$Z_0 \approx 120 \log_e \frac{S}{a} \text{ ohms}$$

When determining the reactance of an impedance consisting of a coil or condenser having negligible losses, the ratio Q becomes extremely high and need not be measured. The reactance X is then given in terms of the distance by the relation:

$$X = Z_0 \cot(360° \, d/\lambda) \text{ ohms}$$

In order that the present invention may be better understood, a theoretical explanation will now be given.

When a sinusoidal voltage, represented by the real part of $E' \epsilon^{j\omega t}$, is impressed upon any transmission line, the voltage and current at any position X distance from the load are given by:

$$E = E_0[\epsilon^{jmx} + K\epsilon^{-jmx}] \quad (1)$$

$$I = \frac{E_0}{Z_0}[\epsilon^{jmx} - K\epsilon^{-jmx}] \quad (2)$$

where $E_0$ is the main wave voltage, $Z_0$ the surge impedance, X the distance from the load end, and $$K = |K|\epsilon^{j\psi}$$

the reflection coefficient, $$m = \frac{2\pi}{\lambda}, \; j = \sqrt{-1}, \; \omega = 2\pi f$$

and $\epsilon$ = Naperian base.

These may be written in the form:

$$E = E_0[\epsilon^{jmx} + |K|\epsilon^{j(\psi-mx)}] = E_0\epsilon^{jmx}[1 + |K|\epsilon^{j(\psi-2mx)}] \quad (3)$$

$$I = \frac{E_0}{Z_0}[\epsilon^{jmx} - |K|\epsilon^{j(\psi-mx)}] = \frac{E_0}{Z_0}\epsilon^{jmx}[1 - |K|\epsilon^{j(\psi-2mx)}] \quad (4)$$

The impedance at any point of the line looking toward the load is:

$$Z_i = \frac{E}{I} = Z_0 \frac{1+|K|\epsilon^{j(\psi-2mx)}}{1-|K|\epsilon^{j(\psi-2mx)}} \quad (5)$$

Now I is a minimum when:

$$\epsilon^{j(\psi-2mx)} = +1 \text{ or when } 2mx = \psi \quad (6)$$

and at this point the impedance is $$Z_i = Z_0 \frac{1+|K|}{1-|K|} \quad (7)$$

which can also be written as $$Z_i = \frac{I_{max.}}{I_{min.}} Z_0 \quad (8)$$

However, $$K_i = \frac{Z-Z_0}{Z+Z_0} \quad (9)$$

from which $$Z = Z_0 \frac{1+K}{1-K} \quad (10)$$

but $$K = |K|\epsilon^{j\psi} = |K|\epsilon^{j2mx} \quad (11)$$

when X is the distance to the minimum current position. Let this particular value of X be $d$, then $$Z = Z_0 \frac{1+|K|\epsilon^{j2md}}{1-|K|\epsilon^{j2md}} = Z_0 \frac{(1+|K|\epsilon^{j2md})(1-|K|\epsilon^{-j2md})}{(1-|K|\epsilon^{j2md})(1-|K|\epsilon^{-j2md})} =$$

$$Z_0 \frac{1-|K|^2+|K|(\epsilon^{j2md}-\epsilon^{-j2md})}{1+|K|^2-|K|(\epsilon^{j2md}+\epsilon^{-j2md})} \quad (12)$$

or $$Z = Z_0 \frac{1-|K|^2+j2|K|\sin 2md}{1+|K|^2-2|K|\cos 2md} \quad (13)$$

but if $$Q = \frac{I_{max.}}{I_{min.}}, \; |K| = \frac{Q-1}{Q+1} \quad (14)$$

and $$Z = Z_0 \frac{2Q+j(Q^2-1)\sin 2md}{Q^2+1-(Q^2-1)\cos 2md} \quad (15)$$

The last formula corresponds to that given above for determining the value of impedance 4.

It will be understood, of course, that the transmission line, if desired, may be open-ended and the impedance to be measured connected at the open end, after which the ratio Q is obtained, and the same procedure as before followed to determine the value of the impedance. In the arrangement described above, the end effect of an open line upon measurement is eliminated. This is due to spreading of the field from the end causing a capacity. In the case of the open-ended line, however, there is a small capacity effect in parallel with the impedance due to line end effect, but usually this is negligible.

When the resistance component of a load impedance is either greater than ten times or less than one-tenth the value of the surge impedance, it is difficult to accurately determine the ratio Q of maximum to minimum current or voltage. This difficulty may be overcome by the following procedure:

Increase either the power or meter sensitivity or both until the minimum current or voltage reading is of sufficient value to be accurately read on the meter. Now choose any arbitrary larger value than the minimum reading and slide the meter both toward and away from the load until this arbitrary larger value of reading is obtained. Carefully measure the distance between the two positions where this arbitrary meter reading is obtained. Call this distance $2s$ and let the ratio of the arbitrary larger reading to the minimum reading be designated by $P$. The formula shown below then gives the ratio of maximum to minimum current or voltage in terms of $P$ and $s$.

$$Q^2 = \frac{P^2-1}{\sin^2 ms} + 1 \qquad (16)$$

where $$m = 360° \times s/\lambda. \qquad (17)$$

In place of the closed loop with sliding meter, a wire with the meter at its center may be used, the wire's ends being capacity coupled to the line conductors through a small spacing. In this case the meter will read voltage distribution, and the fact that a voltage loop coincides with a current minimum should be taken into consideration in applying the relations given. These are easily modified to give the impedance values in terms of distance to a voltage node and voltage ratio.

Fig. 2 shows an arrangement in accordance with the invention for making measurements on a concentric line. A suitable source of high frequency energy 1' is connected to one end of a two wire transmission line 10 which terminates in a coupling loop 11. This coupling loop 11 furnishes high frequency energy to the concentric transmission line 2'. This concentric line is electrically closed at both ends by the end plates 3', 3". The unknown impedance is represented by 4' which is connected between the inside and outside conductors at the connection points 5'. The connection points 5' are located at a distance from the far end terminating plate 3" which is equal to one-quarter wavelength. For determining the location and the ratios of maximum to minimum voltage there is provided a vacuum tube voltmeter 6' connected through a shielded cable 12 to a suitable probe 7' mounted on a support 9', in a manner such that the probe may be slid along a slot cut in the outer conductor of the concentric line. A measuring scale 8 is also shown in position along the line for convenience in accurately locating the position of the sliding probe 7'.

The method of using the arrangement of Fig. 2 to measure the resistive and reactive components of the impedance 4' will now be described. As already mentioned, the impedance 4' is connected to the position exactly one-quarter wavelength from the short circuited end of the concentric line. It has been found both from theoretical considerations and actual measurement that the voltage maximum or current nodal point always exists at exactly one-quarter wavelength from the closed end of a concentric line. In other words, there is no end correction such as is encountered with an open two-wire line. Since the meter shown in this arrangement reads voltage, this must be taken into account when determining the values of the components of the unknown impedance 4'. Otherwise the procedure is similar to that already described in connection with the use of the arrangement of Fig. 1. If we call the distance from the impedance 4' to a voltage maximum $s$, to distinguish this distance from that for a current minimum which we have designated as $d$, we have the relation $s = d \pm \lambda/4$. In terms of the distance $s$ and the ratio $Q$ of maximum to minimum voltage, the resistance and reactance components of the unknown impedance 4' are obtained from the formula:

$$Z = Z_0 \frac{2Q - j(Q^2-1)\sin 2ms}{Q^2+1-(Q^2-1)\cos 2ms} \text{ ohms} \qquad (18)$$

The surge impedance for the concentric line is given by the formula $Z_0 = 60 \log_e + b/a$ where $b$ and $a$ are the radii of the outer and inner conductors respectively. When determining the reactance of an impedance consisting of a coil or condenser having negligible losses, the ratio $Q$ becomes extremely high and need not be measured. The reactance is then given in terms of the distance $s$ by the relation:

$$X = -Z_0 \cot(360 s/\lambda) \text{ ohms} \qquad (19)$$

What is claimed is:

1. In a system for electrical measurement, the combination of a pair of parallel conductors, a source of high frequency energy coupled to said conductors at one end thereof, an impedance to be measured connected across said conductors at the current nodal point nearest the other end of said conductors, a sliding meter coupled to said conductors between said impedance and said source, said meter being arranged for movement along the length of said conductors, and means adjacent said conductors for determining the position of current or voltage maxima or minima on said line with respect to the location of said impedance.

2. In a system for electrical measurement, the combination of a pair of parallel conductors, a source of high frequency energy coupled to said conductors at one end thereof, an impedance to be measured connected across said conductors at the current nodal point nearest the other end of said conductors, a sliding meter coupled to said conductors between said impedance and said source, said meter being arranged for movement along the length of said conductors and having a loop of wire arranged between said parallel conductors for inductive coupling thereto, and means for determining the position of energy maxima or minima on said line with respect to the location of said impedance.

3. In a system for electrical measurement, the combination of a pair of parallel conductors, a source of high frequency energy coupled to said conductors at one end thereof, a short-circuiting strip connected across the other end of said conductors, an impedance to be measured connected across said conductors at the current nodal point nearest said strip, a slidable meter assembly coupled to said conductors between said impedance and said source, said meter being arranged for movement along the length of said conductors, and means adjacent said conductors for determining the position of current or voltage maxima or minima on said line with respect to the location of said impedance.

4. In a system for electrical measurement, the combination of a concentric line whose inner and outer conductors are electrically closed at both ends, a source of high frequency energy coupled to said conductors near one end thereof, an impedance to be measured connected across the inner and outer conductors of said line at a distance equal to one-quarter wavelength from the other end of said conductors, a meter coupled to said conductors between said impedance and said source, means for moving along a portion of the length of said conductors the effective coupling point of said meter to said conductors, and a scale located adjacent said conductors for locating the position of the coupling point of said meter to said conductors.

5. In a system for electrical measurement, the combination of a concentric line whose inner and outer conductors are electrically closed at both ends, a source of high frequency energy coupled to said conductors near one end thereof, an impedance to be measured connected across the inner and outer conductors of said line at a distance equal to one-quarter wavelength from the other end of said conductors, a vacuum tube voltmeter connected to a probe, said probe being mounted on a movable support on said line and being movable over a portion of the length of said line, said portion of line having a slot in the outer conductor for enabling the probe to be inserted into the interior of said line, and a scale positioned along said portion of the line for accurately locating the position of said probe.

6. A system in accordance with claim 1, in which said pair of parallel conductors are longer than three-quarters of the length of the operating wave.

PHILIP S. CARTER.